Figure 1:
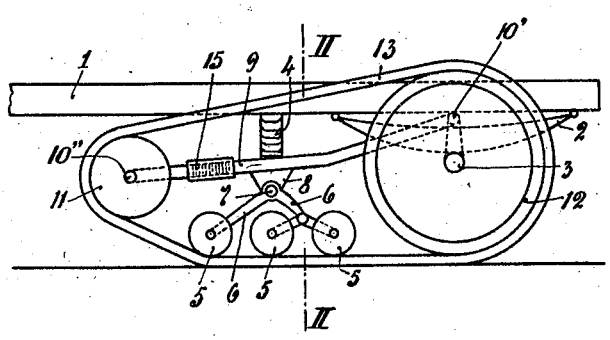

Nov. 10, 1931.   E. R. KORNBECK   1,831,012
AUTOMOBILE OF THE CRAWLER TYPE

Filed Feb. 10, 1928

Inventor
ERNST R. KORNBECK

By

ATTORNEY

Patented Nov. 10, 1931

1,831,012

UNITED STATES PATENT OFFICE

ERNST RØNNE KORNBECK, COPENHAGEN, DENMARK

AUTOMOBILE OF THE CRAWLER TYPE

Application filed February 10, 1928, Serial No. 253,482, and in Denmark February 16, 1927.

This invention relates to power driven field vehicles such as field autos wherein a traction belt envelops a drive wheel and a plurality of rolls which are arranged to form an expanding system which acts to expand or tense the belt and increase the friction between the same and said drive wheel when the vehicle encounters rough or soft ground.

It is of course an accepted fact that field automobiles, i. e. automobiles which have to be driven not only along improved roads but also across uneven fields, soft ground and the like, have to fill certain requirements which are to some extent incompatible. Since the motion of the automobile in a country with a well developed net of roads will mainly be along smooth roads, the automobile must be suited for fast driving on the road, and it must be able to endure such driving, and it must be easy and safe to steer, which last condition requires a sufficient steering-wheel pressure. Away from improved roads it must also be able safely to pass uneven or soft ground and to move along quite considerably sloping ground.

The ordinary freight automobile meets well enough the requirements to be filled when driven along improved roads, but not the requirements to be filled during passage over unimproved roads. When soft ground occurs, the said requirements are best filled by an automobile with driving belts, and where the ground is especially uneven, they are best filled by an automobile with two driving axles.

The present invention has for its object to provide such an arrangement of the driving mechanism of the automobile that all the above mentioned different necessary requirements will be filled simultaneously, whereby reliable driving of the automobile on uneven ground may be secured simultaneously with fast and safe driving on improved road without any excessive wear on any of the parts of the driving mechanism.

According to the invention this object is attained by building the automobile like an ordinary freight automobile, in so far as it is fitted with front wheels (steering wheels) as well as with rear wheels (driving wheels) but is further fitted with a driving belt which passes about the rear wheel and a guiding roll. Said driving belt is actuated by pressure rolls, and extends towards the front wheel in such a manner that the rear wheel, when the supporting rolls enter into operation, will serve as driving wheel for the belt, and will pull towards the rear the bottom part of the said belt, whereby the automobile itself will be pulled forward.

According to the invention means are further provided to prevent the said supporting rolls from becoming operative as such, as long as the automobile is driven along improved roads, but to cause them on the other hand to take care of the load, automatically, as soon as the rear wheels, during driving along uneven or soft ground, refuse to operate as supporting members, there being at the same time produced such a belt tension, increasing with the decreasing activity of the rear wheels as supporting members, that there will be generated, between the periphery of the driven rear wheels and the surface of the two belts passing each about one of the rear wheels, the friction needed for reliable action of the driving mechanism. The belt itself is adjusted in such a manner that it will be practically free of tension, when the automobile is driven along improved roads. By the above mentioned combined arrangement of the driving mechanism the belt, when driving along improved roads, will only be exposed to compression, viz. below the rear wheel of the automobile, and consequently only to slight wear, and as explained below the further advantage will be attained that although during driving along improved roads the front wheels of the automobile are exposed to the relatively high wheel pressure which is necessary for reliable steering of the automobile during fast driving, then this wheel pressure when driving for instance on soft ground will be essentially reduced since it is partly transmitted to the system of supporting rolls, or idler rolls 5, 5 as they may also be termed.

The invention is illustrated in one single embodiment on the drawings, where

Figure 2:
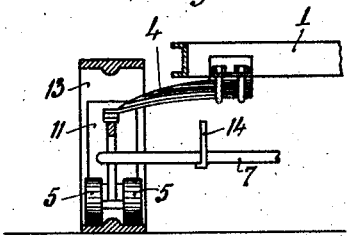

Fig. 1 shows the rear portion of an automobile according to the invention here referred to, and Fig. 2 is a cross-section along the line II—II in Fig. 1.

On the drawings 1 is the underframe proper which in ordinary manner is supported by the rear-wheel axle 3 by way of springs 2. The rear wheels are fitted with suitable felloes 12. Near the rear-wheel axle 3, but not coincident with the latter, fixed pivots 10' are provided for a single-armed lever 9 the free end 10'' of which is fitted with a shaft for a guiding roll 11. It should be noted that there are of course two such levers 9, viz. one on each side of the vehicle, and when in the following one side is described then it will be clear that all these members are provided correspondingly on the opposite side of the vehicle.

The lever 9 may suitably be made in two pieces between which a spring 15 may be inserted in a sleeve, the said spring being compressed when the tension in the belt becomes too high. An endless band or belt 13 passes about the rear-wheel felloe 12 and the guiding roll 11, in such a manner, that the said belt may be given a suitable degree of tightness by means of the spring 15. Transversely to the two levers 9 there is provided a shaft 7 supported by brackets 8 on the levers 9. On the ends of the said shaft 7 there is journalled a bell-crank lever 6 to one extremity of which there is journalled another bell-crank lever, rolls 5 being provided at the ends of all three lever arms which may be fork-shaped so as to straddle the running rolls. Finally one or more springs 4 are inserted between the levers 9 and the underframe 1 of the vehicle.

When the automobile is travelling on improved roads there is very little tension in the belt 13, in fact the principal stress to which the belt is then subject is one of compression between the felloe 12 and the road. Since there is such reduced tension in the belt, rolls 5 being on lever 9, will be slightly raised and normally idling and carried on belt 13 which is not in contact with the road at this point under such conditions. A manually controlled means 14 integral with axle 7 is attached to but operated adjustably at the underframe or from the driver's seat in such a manner so that when the automobile is travelling on an improved road the rolls 5 may be maintained so that they do not exert any pressure on the belt 13. When the automobile leaves improved roads however and enters an unimproved road or soft ground, then the rear wheels will sink into the ground and the rolls 5 will thereby be loaded. It is manifest that the driving wheel, lever 9, pivot 10' above the rear shaft 3 and the guide roll 11 constitute an expanding system in which two of the pivots, that is shaft 3 and pivot 10' are stationary relative to the vehicle itself while actuation of said system through loading of the idler or supporting rolls tends to expand or tense the belt thereby improving the traction of the vehicle over unequal ground surfaces.

The vertical pressure on the rear wheels proper will thus be reduced proportionally to the sinking of the rear wheels, and the load on the rolls 5 will increase correspondingly, and this pressure will be transmitted to the underframe by way of the levers 9 and the springs 4. The compression of the springs 4 will cause the arms 9 to swing somewhat upward whereby owing to the eccentric arrangement of the lever arms 9 relatively to the rear axle 3 a tension will be introduced in the belt 13 which tension will increase with the load on the rolls and will produce a friction between the belt 13 and the wheel felloe 12, in such a manner that the pull from the rear wheel will now be transmitted partly by means of the decreasing rear-wheel pressure and partly by the increasing friction between the belt and the felloe.

Having now described my invention, what I claim as new and desire to secure by Letters Patent is:

1. In a field automobile having an endless belt enveloping a rear wheel thereof and arranged to be driven by said wheel, an expanding system for increasing the friction of said belt with respect to said rear wheel, including the combination, with a shaft for said rear wheel, of a lever pivoted at one end a distance above said shaft and arranged with its free end a distance below the general level of the pivoted end thereof and swingable in a vertical plane, a guiding roll rotatably borne upon the free end of said lever within said belt, idler rolls rotatably borne beneath an intermediate portion of said lever within said belt and normally making light traction therewith, and resilient means associated with said lever between the intermediate portion of the lever and said guiding roll to relieve excess strain upon said belt during expansion thereof, said lever being swung upward against the resistance of the belt and tending to expand said belt by increasing the distance between said guiding roll and said drive wheel upon the latter encountering soft or irregular ground surface, which tends to change the level of said idler rolls with respect to the rear wheel and thereby positively raise said lever into expanding position.

2. In a field automobile having an endless belt enveloping a rear wheel thereof and arranged to be driven by said wheel, an expanding system for increasing the friction of said belt with respect to said rear wheel, including the combination, with a shaft for said rear wheel, of a lever pivoted at one end a distance above said shaft and arranged with its free end a distance below the general level of the pivoted end thereof and swingable in a vertical plane, a guiding roll rotatably borne upon the free end of said lever within said belt, idler rolls rotatably borne beneath an intermediate portion of said lever within said belt and normally making light traction therewith, a resilient support also connected to the intermediate portion of said lever and attached to said automobile, and resilient means associated with said lever between the intermediate portion of the lever and said guiding roll to relieve excess strain upon said belt during expansion thereof, said lever being swung upward against the resistance of the resilient means and tending to expand said belt by increasing the distance between said guiding roll and said drive wheel upon the latter encountering soft or irregular ground surface, which tends to change the level of said idler rolls with respect to the rear wheel and thereby positively raise said lever into expanding position.

3. In a field automobile having an endless belt enveloping a rear wheel thereof and arranged to be driven by said wheel, an expanding system for increasing the friction of said belt with respect to said rear wheel, including the combination, with a shaft for said rear wheel, of a lever pivoted at one end a distance above said shaft and arranged with its free end a distance below the general level of the pivoted end thereof and swingable in a vertical plane, a guiding roll rotatably borne upon the free end of said lever within said belt, idler rolls rotatably borne beneath an intermediate portion of said lever within said belt and normally making light traction therewith, a resilient support also connected to the intermediate portion of said lever and attached to said automobile, an alterable stop arranged to prevent said idler rolls from loading said belt when said automobile is passing over level ground, and resilient means associated with said lever between the intermediate portion of the lever and said guiding roll to relieve excess strain upon said belt during expansion thereof, said lever being swung upward against the resistance of the resilient means and tending to expand said belt by increasing the distance between said guiding roll and said drive wheel upon the latter encountering soft or irregular ground surface, which tends to change the level of said idler rolls with respect to the rear wheel and thereby positively raise said lever into expanding position.

In testimony whereof I affix my signature.

ERNST RØNNE KORNBECK.